June 22, 1965 R. A. BAUGH ETAL 3,191,011

APPARATUS FOR DETERMINING THE ALGEBRAIC SIGN OF A RESIDUE CODED NUMBER

Filed July 19, 1961 4 Sheets-Sheet 1

INVENTORS
RICHARD A. BAUGH &
BY ELMER C. DAY

Carl V. Olson

ATTORNEY

INVENTORS
RICHARD A. BAUGH &
BY ELMER C. DAY
Carl V. Olson
ATTORNEY

INVENTORS
RICHARD A. BAUGH &
BY ELMER C. DAY
Carl V. Olson
ATTORNEY

INVENTORS
RICHARD A. BAUGH &
BY ELMER C. DAY
Carl V. Olson

United States Patent Office 3,191,011

Patented June 22, 1965

3,191,011

APPARATUS FOR DETERMINING THE ALGEBRAIC SIGN OF A RESIDUE CODED NUMBER

Richard A. Baugh, Collingswood, and Elmer C. Day, Haddonfield, N.J., assignors to Radio Corporation of America, a corporation of Delaware Filed July 19, 1961, Ser. No. 125,183
2 Claims. (Cl. 235—156)

This invention relates to data processing apparatus employing the residue number system, and particularly to means for determining the algebraic sign of a residue coded number. In the residue number system, numerical values are represented by digits formed from the least positive residues with respect to different number bases.

An advantage of using the residue number system in computers is that the operations of addition, subtraction and multiplication can be performed simply, directly and rapidly without any provision for handling the carry which is involved in arithmetic operations in the decimal, binary and other number systems. Using residue coded numbers, multiplication can be performed in the same time period as addition and subtraction, and the same hardware can be used for all three of the operations, addition, subtraction and multiplication.

In the residue number system, a numerical quantity is represented by the least positive residues with respect to a plurality of bases or moduli. For example, the decimal numbers and corresponding residue coded numbers using moduli 3 and 4 are as follows:

| Decimal number | Residue coded number | |
|---|---|---|
| | Modulo 3 | Modulo 4 |
| 0 | 0 | 0 |
| 1 | 1 | 1 |
| 2 | 2 | 2 |
| 3 | 0 | 3 |
| 4 | 1 | 0 |
| 5 | 2 | 1 |
| 6 | 0 | 2 |
| 7 | 1 | 3 |
| 8 | 2 | 0 |
| 9 | 0 | 1 |
| 10 | 1 | 2 |
| 11 | 2 | 3 |

In the foregoing table, the decimal number 5, for example, is equivalent to the residue coded number 21 where 2 is the least positive residue of 5 to the base or modulo 3 and 1 is the least positive residue of 5 to the base or modulo 4. For decimal numbers of 12 and higher, the corresponding residue coded numbers repeat. Therefore, a residue coded number system employing the moduli 3 and 4 is capable of uniquely representing 12 different numerical quantities.

When it is desired to handle a larger quantity of numerical values, it is necessary to employ a larger number of different moduli (for example, to employ moduli 3, 4 and 5), or to employ higher valued moduli (for example, moduli 30 and 31). Both measures can be taken, such as by employing a larger number of higher valued moduli (for example, moduli 61, 62 and 63). In order to eliminate redundancy, the moduli must be relatively prime. Moduli are relatively prime if no pair of moduli have common devisors. Therefore, to avoid a common divisor of 2, only one even numbered modulo can be used. The present invention will be explained employing a residue coded number using moduli 5, 6 and 7. A residue number system to the moduli or bases 5, 6 and 7 uniquely defines 210 different numerical values, 0 through 209.

Further description of the residue number system may be found in a paper entitled, "The Residue Number System," by Harvey L. Garner in the Proceedings of Western Joint Computer Conference, 1959; and in a paper entitled, "A Digital Correlator Based on the Residue Number System," by Philip W. Cheney in the IRE Transactions on Electronic Computers, March 1961.

Electronic computers generally include means for comparing two quantities to determine which is the larger. If the quantities have different algebraic signs, the quantity having the positive sign is larger than the quantity having the negative sign. If the quantities are both of the same sign, one quantity is subtracted from the other and the sign of the result indicates which quantity is the larger. For this and other reasons, it is useful to be able to determine the sign of an answer obtained from the subtraction unit in the computer.

In the handling of negative numbers in a computer, the arithmetic processes are simplified when a complement number system is employed. For example, it is common to employ the tens complement system, or the nines complement system, wherein a portion of the numbers available are used to represent positive numbers, and a remainder of the numbers available are employed to represent negative numbers. Complement numbering systems are devised in such a way that when a number representing a value with positive sign is added to the number representing the same value with negative sign, the sum equals a number corresponding with 0. When conventional number systems are thus employed, positive and negative numbers are always different from each other and the sign of any given number is apparent from the group in which one digit of the number falls. It is therefore a simple matter to examine a number and determine whether it represents a positive or a negative quantity.

Negative numbers may be represented by complements in a residue number system also, by assigning values such that when a residue coded number corresponding to a given value with positive sign is added to the residue coded number corresponding with the same value with negative sign, the sum is equal to 0. However, the residue number system is peculiar in that it is not apparent from an examination of any given residue coded number whether it represents a positive value or a negative value. For example, the complement system as applied to the residue coded numbers moduli 3 and 4 is as follows:

| Decimal number | Residue coded number | |
|---|---|---|
| | Modulo 3 | Modulo 4 |
| 0 | 0 | 0 |
| 1 | 1 | 1 |
| 2 | 2 | 2 |
| 3 | 0 | 3 |
| 4 | 1 | 0 |
| 5 | 2 | 1 |
| −6 | 0 | 2 |
| −5 | 1 | 3 |
| −4 | 2 | 0 |
| −3 | 0 | 1 |
| −2 | 1 | 2 |
| −1 | 2 | 3 |

It is clear from an examination of the foregoing chart that there is no apparent way to determine whether a given residue coded number falls in the first half of the table representing positive numbers 0 through 5, or falls in the second half of the table representing negative numbers −1 through −6. This is an inherent characteristic of the residue number system which has impeded the use of residue numbers in computers. A table-look-up memory may be employed to determine the sign of any given residue coded number. However, this would require an excessively large amount of equipment.

The need to know the sign of a residue coded number often arises after an arithmetic process has been completed yielding an answer which is the sum, difference or product of two previous numbers. The sign of the answer must be determined and associated with the answer so that comparisons can be made in the future to determine whether the answer is greater than or less than another number.

It is therefore a general object of this invention to provide an improved means for determining the algebraic sign of a residue coded number.

It is another object of this invention to provide an electronic computer apparatus including an arithmetic unit for operating on residue coded numbers, and including a relatively small amount of additional equipment for use in combination with the arithmetic unit for determining the algebraic sign of a residue coded number.

According to the invention, a residue number system is employed wherein each decimal number quantity is represented by digits derived from the least positive residues of the decimal number with respect to a plurality of bases or moduli. The moduli are relatively prime, meaning that they have no common divisor. Only one of the moduli is an even number. The quantity of available different residue coded numbers is equal to the product of the moduli. Positive values are assigned to the first half of the numbers and negative values are assigned to the second half of the numbers according to a complement scheme in which the sum of positive and negative residue coded numbers of the same absolute value is equal to zero.

The sign of any given residue coded number is determined by means which translates the residue number to a translated residue number wherein the digits corresponding to all but one of the odd moduli are at an extreme value, such as zero or a maximum, for the respective moduli. Means are provided to then convert the translated number digits which correspond to the remaining odd modulo and the even modulo to a signal indicative of the sign of the original given residue coded number.

These and other objects and aspects of the invention will be apparent to those skilled in the art from the following more detailed description taken in conjunction with the appended drawings, wherein.

Figure 1:
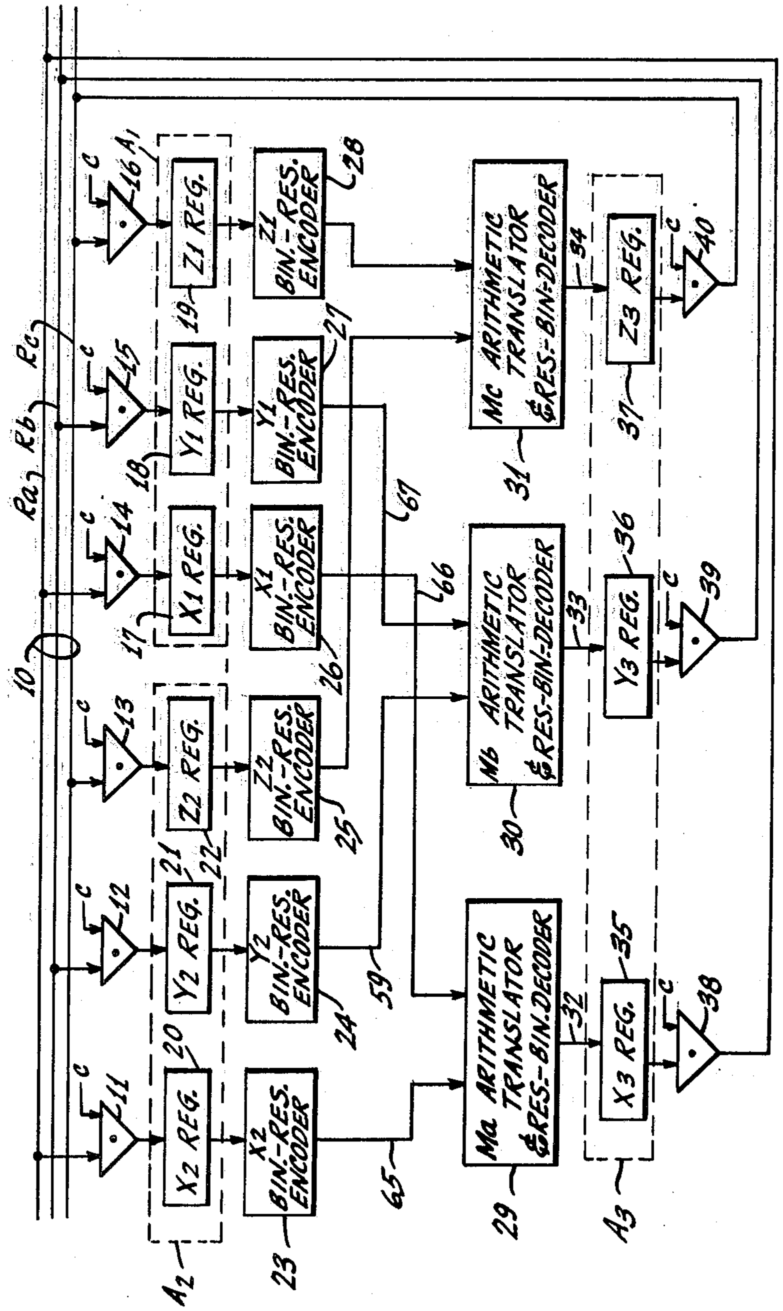
FIGURE 1 is a block diagram of the arithmetic unit of a computer employing the residue number system.

FIGURE 1 is a diagram of an arithmetic unit designed to perform the operations of addition, subtraction and multiplication. This arithmetic unit is shown and will be briefly described to provide a general understanding of the environment of the present invention. Binary coded residue numbers are made available to the arithmetic unit on a main bus 10 including three sets of conductors each set carrying one of the digits $R_a$, $R_b$ and $R_c$ of the binary coded residue number. The arithmetic unit operates on two binary coded residue number operands which are sequentially transferred from the main bus 10 to the register $A_1$ and the register $A_2$ through gates 11 through 16 in response to control signals applied to the terminals C of the gates. The register $A_1$ then contains the three digits of the binary coded residue number of one operand in the respective digit registers 17, 18 and 19. The digits of the other operand are in the respective digit registers 20, 21 and 22 of the $A_2$ register. The circuits used in the arithmetic and translation units are of conventional type such as "and" gates, flip-flop registers and binary decoders and encoders. Suitable circuits are described in any standard text on digital computer circuits, for example, the text, "Digital Computer Components and Circuits," by R. K. Richards.

The binary coded residue digits in the six-digit registers are translated to simple residue coded numbers by means of six binary-to-residue encoders 23 through 28, from which they are applied to $M_a$, $M_b$, and $M_c$ arithmetic translators and residue-to-binary decoders 29, 30 and 31, respectively. The $M_a$ translator and decoder 29 receives the digits $R_a$ corresponding to modulo $M_a$ of both operands from encoders 23 and 26; the $M_b$ translator and decoder 30 receives the digits $R_b$ corresponding to the modulo $M_b$ of both operands from encoders 24 and 27; and the $M_c$ translator and decoder 31 receives the digits $R_c$ corresponding to the modulo $M_c$ of both operands from encoders 25 and 28. The translators and decoders 29, 30 and 31 provide outputs on leads 32, 33 and 34 which are binary coded residue digits representing the answer derived from an arithmetic operation. The digits of the answer appear in the $X_3$, $Y_3$ and $Z_3$ digit registers 35, 36 and 37 of the $A_3$ register. The binary coded residue number supplied to the $A_3$ register is the arithmetic sum, difference, or product of the binary coded residue number operands initially put into the $A_1$ and $A_2$ registers. The arithmetic answer in the $A_3$ register is gated through gates 38, 39 and 40 back to the main bus 10.

The foregoing description of FIGURE 1 briefly describes the organization and functioning of an arithmetic unit in a computer designed to utilize the residue number system in performing addition, subtraction and multiplication. A portion of the equipment shown in FIGURE 1 is also employed, together with a small amount of additional equipment, for the purpose of determining the sign of a residue coded number on the main bus 10. The portions of the system of FIGURE 1, and the additional equipment, used for sign determination, will now be described in greater detail.

Figure 2:
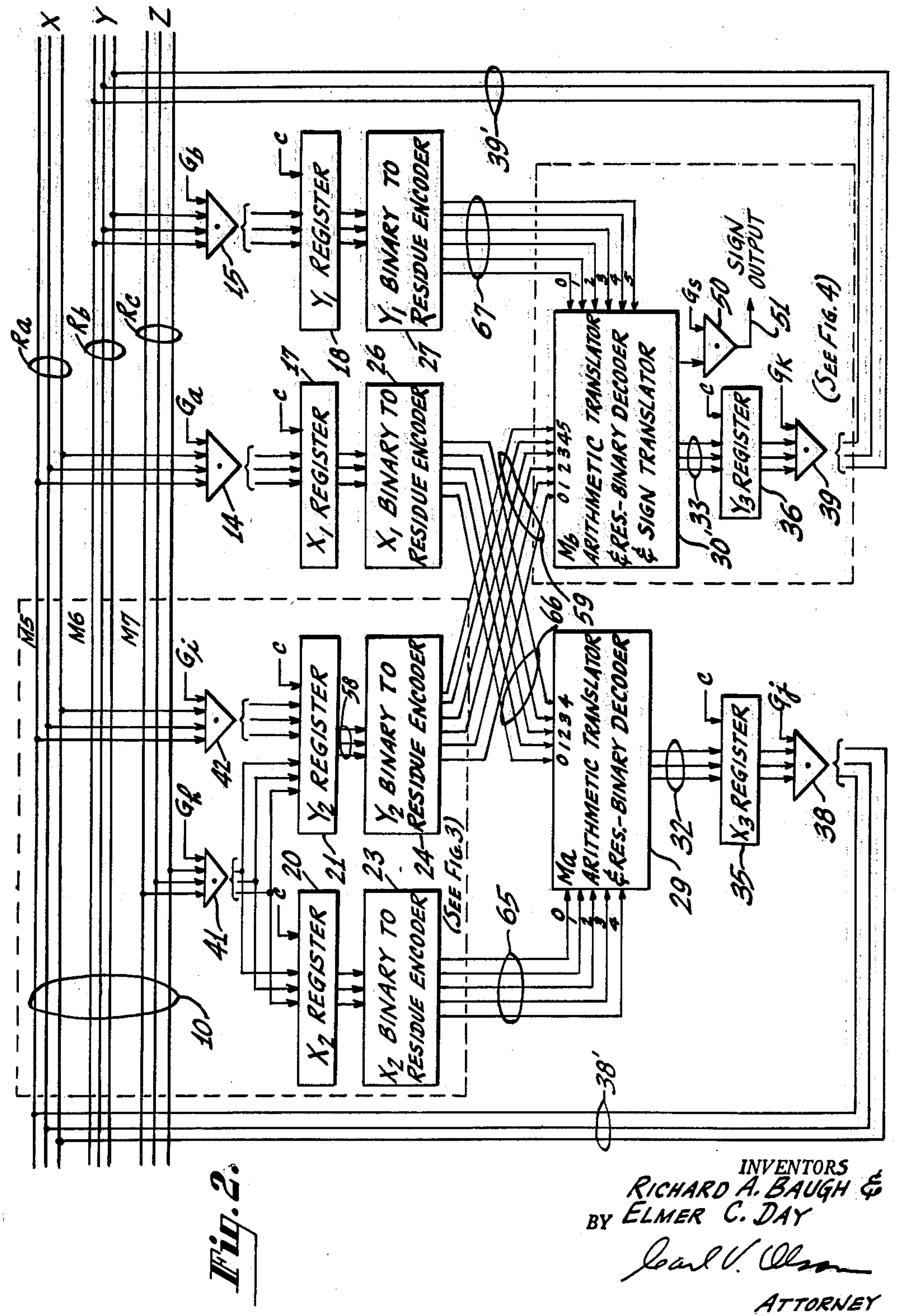
FIGURE 2 is a block diagram showing that portion of the arithmetic unit of FIGURE 1 which is employed for the determination of the sign of a residue coded number.

FIGURE 2 shows the portions of the system of FIGURE 1, and additional equipment, employed for the purpose of sign determination. It will be noted that the system of FIGURE 2 differs from the system of FIGURE 1 in that the following units are omitted: $Z_1$ and $Z_2$ registers 19 and 22, $Z_1$ and $Z_2$ binary-to-residue encoders 28 and 25, the $M_c$ arithmetic translator and residue-to-binary decoder 31, and the $Z_3$ digit register 37. Another difference is that in FIGURE 2 the $M_b$ translator and decoder 30′ is indicated as having means for performing an additional function in connection with sign determination. FIGURE 2 also differs from FIGURE 1 in that FIGURE 2 shows the number of individual conductors in the main bus 10 and in the connections between the various units. The number of conductors shown in FIGURE 2 are appropriate in a system according to an example which is used in explaining the invention, the example being one wherein the number system employed is a residue coded number system formed using bases or moduli 5, 6 and 7 for the three digits of the residue coded number. It will be understood that the invention is not limited to this particular residue coded number system.

The main bus 10 includes three conductors $R_a$ for conveying the first digit $R_a$ of a binary coded residue number. Since the first digit $R_a$ represents a residue having any value between 0 and 4 (residues to the base or modulo 5), the digit can be represented in binary form by three binary digits on the three conductors. The residue digit $R_b$, modulo 6, consists of numbers between 0 and 5 which in binary form may be conveyed on three conductors. Also, the digit $R_c$, modulo 7, consists of numbers between 0 and 6 which may be represented in binary form on three conductors.

Gates 41, 42, 14 and 15 are provided to selectively direct binary coded residue digits on the main bus 10 to certain ones of the $X_2$, $Y_2$, $X_1$ and $Y_1$ digit registers 20, 21, 17, 18. The outputs of the digit registers are coupled to respective binary-to-residue encoders 23, 24, 26, 27 which translate binary coded residue digits on three conductors to simple residue coded numbers wherein one of a plurality of conductors is energized. The outputs of the $X_2$ and $X_1$ encoders 23 and 26 are supplied as inputs to the $M_a$ arithmetic translator and residue-to-binary decoder 29. The outputs of the $Y_2$ and $Y_1$ encoders 24 and 27 are supplied as inputs to the $M_b$ arithmetic translator and residue-to-binary decoder and sign translator unit 30′. The $M_a$ and $M_b$ translators and decoders 29 and 30′ have binary coded residue digit outputs on lines 32 and 33 supplied to $X_3$ and $Y_3$ digit registers 35 and 36, respectively. The contents of these registers may be selectively gated over lines 38′ and 39′ to the main bus by means of gates 38 and 39. The $M_b$ translator and decoder 30′ also includes a sign translator which supplies a sign output through a gate 50 to an output lead 51.

Figure 3:
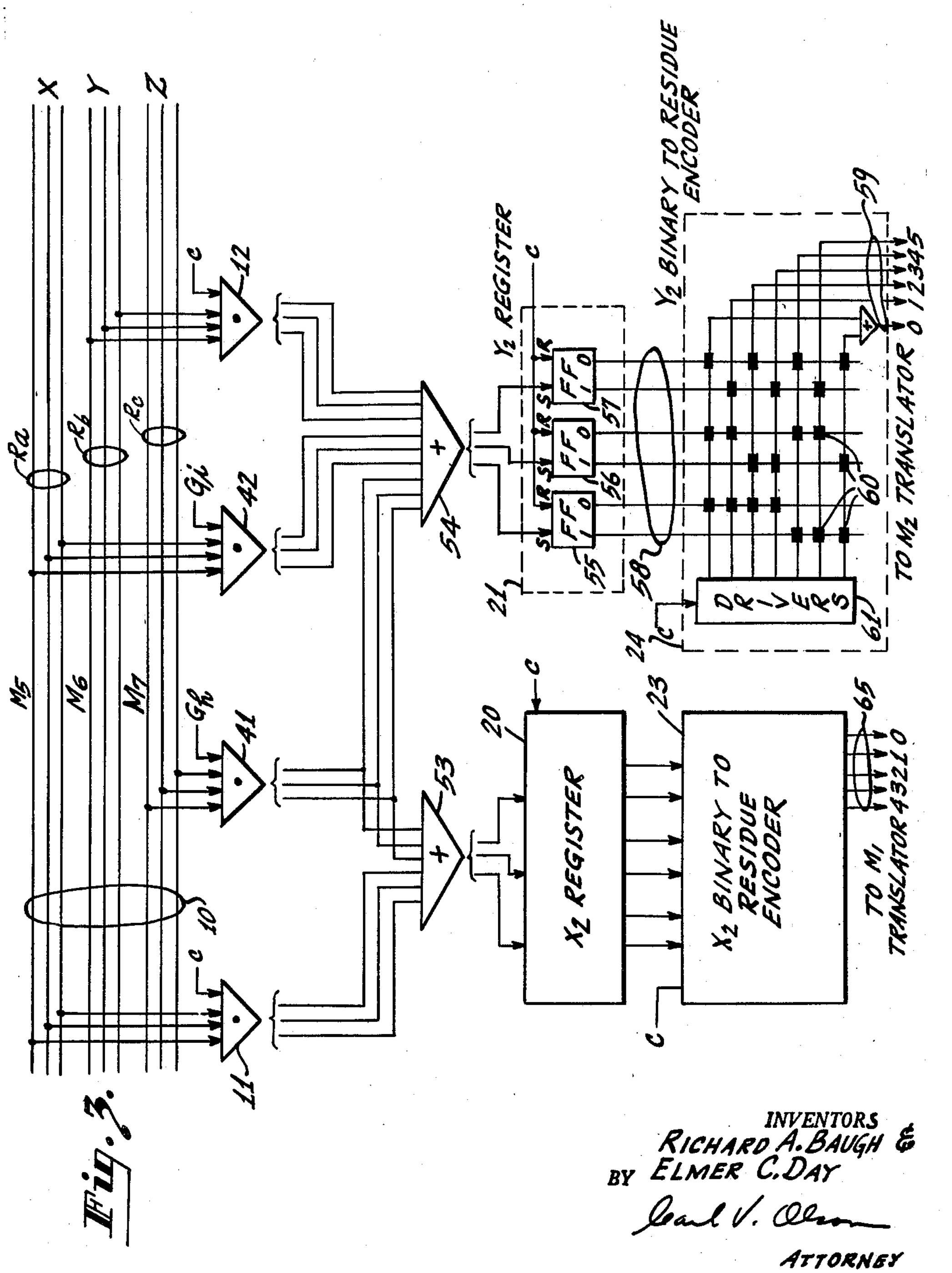
FIGURE 3 is a more detailed diagram of a portion of the diagram of FIGURE 2.

FIGURE 3 shows in greater detail that portion of FIGURE 2 including the $X_2$ register 20 and associated $X_2$ encoder 23, the $Y_2$ register 21 and associated encoder 24, and the connections thereto from the main bus 10. Gates 11 and 12 are employed during the performance of arithmetic operations such as addition, subtraction and multiplication for conveying $R_a$ and $R_b$ digits from the main bus 10 to the $X_2$ register 20 and the $Y_2$ register 21, respectively. These gates 11 and 12 are not used during the operation of sign determination according to the invention, but rather the gates 41 are employed for conveying the digit on the $R_c$ line to both the $X_2$ register 20 and the $Y_2$ register 21, and the gates 42 are employed for conveying the digit on the $R_a$ line to the $Y_2$ register 21. To enable the multiple use of the $X_2$ and $Y_2$ registers 20 and 21, "or" gates 53 and 54 are added at the inputs to the respective registers.

FIGURE 3 shows the $Y_2$ register 21 to consist of three flip-flops 55, 56 and 57, each having a signal input to a set terminal S and the gating signal C to a reset input R, and each having corresponding "1" and "0" outputs coupled to the $Y_2$ binary-to-residue encoder 24. The $X_2$, $X_1$, and $Y_1$ registers 20, 17 and 18 in FIGURE 2 are similarly constructed. FIGURE 3 also shows the construction of the $Y_2$ encoder 24. The $X_2$, $X_1$ and $Y_1$ binary-to-residue encoders 23, 26 and 27 are similarly constructed. The $Y_2$ encoder 24 includes three pairs of input conductors 58 and six output conductors 59. Elements such as diodes 60, indicated by the solid rectangles, are connected between conductors at certain of the crossovers. The encoder is constructed in a conventional manner so that a binary coded residue number applied on the input conductors 58 results in the energization of one and only one of the output conductors 59. For example, if the input signal is a binary 2, 010, only the output conductor labeled 2 is energized. The input binary coded residue number is translated to signal on an appropriate one of the residue number output leads 59 in response to the control signal C applied to the drivers 61 in the encoder.

Figure 4:
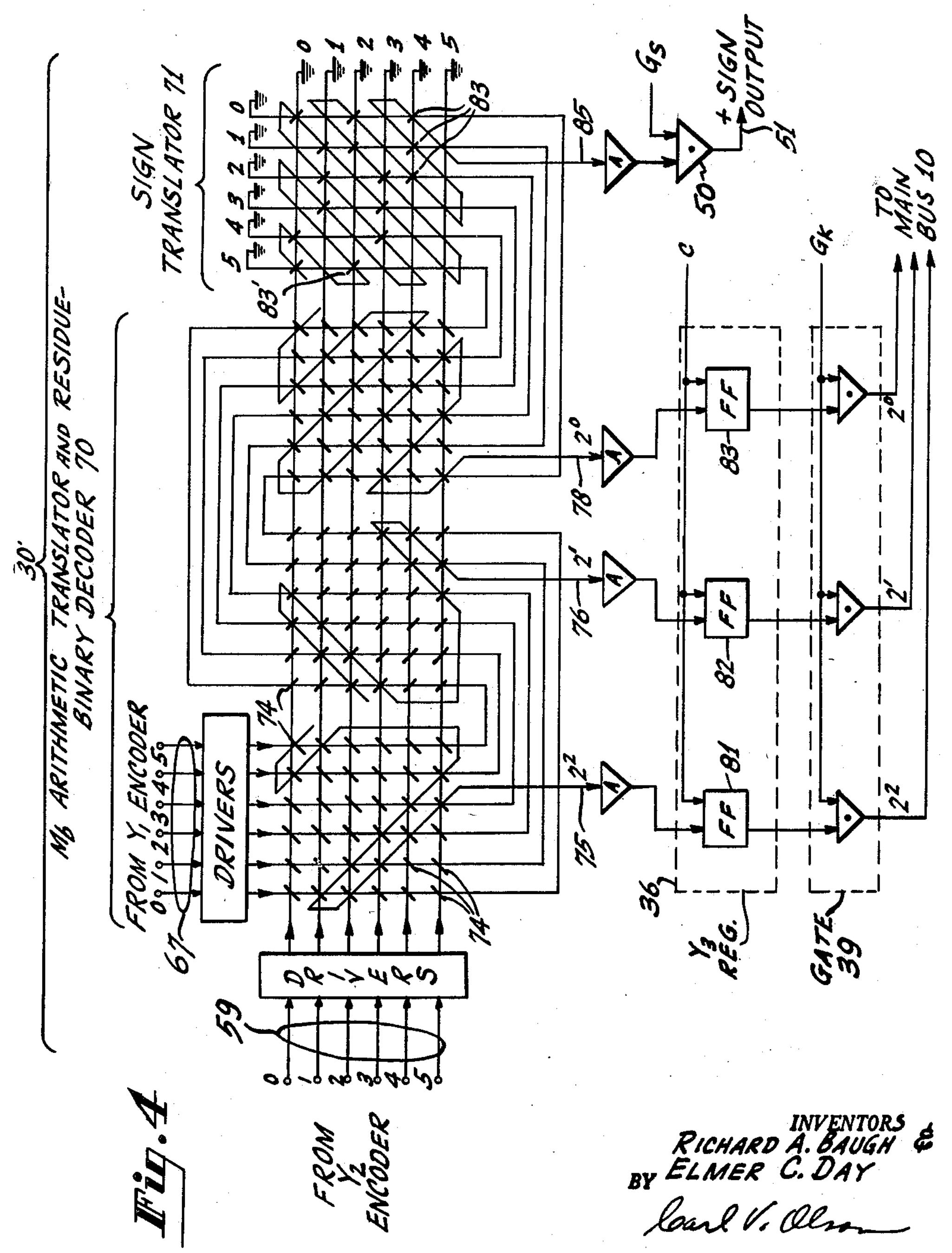
FIGURE 4 is a more detailed diagram of another portion of the diagram of FIGURE 2.

FIGURE 4 shows circuit details of the $M_b$ arithmetic translator and residue-to-binary decoder and sign translator 30′ in the system of FIGURE 2. In FIGURE 4, the portion 70 of the circuit is designed to perform arithmetic translation and residue-to-binary decoding. This portion 70 of the $M_b$ translator 30′ is illustrative also of the $M_a$ and $M_c$ translators and decoders 29 and 31 in FIGURE 1 and 29 in FIGURE 2. The $M_b$ translator and decoder 70 has appended thereto the sign translator 71 which is employed exclusively for performing the sign determination function.

The $M_b$ arithmetic translator and decoder 70 includes a matrix of input conductors 59 from the $Y_2$ encoder 24 and orthogonal conductors 67 from the $Y_1$ encoder 27. The matrix includes elements such as magnetic cores 74 at each crossover of the conductors, and includes output sense windings 75, 76 and 78 linking selective ones of the magnetic cores. The sense winding 75 is threaded through the cores in such a way as to directly provide signals representing the first binary coded digit $2^2$ of the difference between the residue coded input on one of lines 67 from the $Y_1$ encoder 27 and the residue coded input on one of lines 59 from the $Y_2$ encoder 24. In similar fashion, the sense windings 76 and 78 provide respectively signals representing the second binary digit $2^1$ and the third binary digit $2^0$ of the difference between the inputs 67 and 59 from the $Y_1$ and $Y_2$ encoders. The sense windings 75, 76 and 78 together directly provide a coded signal indicating the difference between the input numbers, the answer being in binary coded residue number form.

Additional windings (not shown), thread the cores in different ways to directly provide signals for the sum and the product of the input numbers. The same matrix hardware, with the additional windings, can perform all three of the arithmetic operations of addition, subtraction and multiplication. In FIGURE 4, the sense windings 75, 76 and 78 providing the difference between the input numbers is illustrated because the arithmetic operation of subtraction is employed in performing the sign determination in the example of the invention to be described in detail.

The output sense windings 75, 76 and 78 from the translator and decoder 70 are applied through amplifiers A to the $Y_3$ register 36 from which they are gated by gate 39 to the main bus 10. The $Y_3$ register 36 is conventional in including three flip-flops 81, 82 and 83, the illustrated construction being also illustrative of the $X_3$ and $Y_3$ registers 35 and 37 in FIGURE 1, and the $X_3$ register 35 in FIGURE 2.

The sign translator 71 in FIGURE 4 includes magnetic cores 83 at certain crossover points of the input lines 67 and 59 to the translator and decoder 70. A sense winding 85 linking the magnetic cores in the sign translator 71 provides an output signal representing the algebraic sign of the residue coded number at the conclusion of the sign determination portion of the operation of the apparatus. The sense winding 85 is connected through an amplifier A and a gate 50 to a sign output lead 51.

All of the above-described apparatus is illustrative of one example of the invention, namely, an example employing a specific residue number code involving moduli 5, 6 and 7. Such a residue number code is set forth in the following Table I:

*Table I*

| Positive numbers | | | | | | Negative numbers | | | | | |
|---|---|---|---|---|---|---|---|---|---|---|---|
| N | 567 | N | 567 | N | 567 | N | 567 | N | 567 | N | 567 |
| 0 | 000 | 35 | 050 | 70 | 040 | −105 | 030 | −70 | 020 | −35 | 010 |
| 1 | 111 | 36 | 101 | 71 | 151 | −104 | 141 | −69 | 131 | −34 | 121 |
| 2 | 222 | 37 | 212 | 72 | 202 | −103 | 252 | −68 | 242 | −33 | 232 |
| 3 | 333 | 38 | 323 | 73 | 313 | −102 | 303 | −67 | 353 | −32 | 343 |
| 4 | 444 | 39 | 434 | 74 | 424 | −101 | 414 | −66 | 404 | −31 | 454 |
| 5 | 055 | 40 | 045 | 75 | 035 | −100 | 025 | −65 | 015 | −30 | 005 |
| 6 | 106 | 41 | 156 | 76 | 146 | −99 | 136 | −64 | 126 | −29 | 116 |
| 7 | 210 | 42 | 200 | 77 | 250 | −98 | 240 | −63 | 230 | −28 | 220 |
| 8 | 321 | 43 | 311 | 78 | 301 | −97 | 351 | −62 | 341 | −27 | 331 |
| 9 | 432 | 44 | 422 | 79 | 412 | −96 | 402 | −61 | 452 | −26 | 442 |
| 10 | 043 | 45 | 033 | 80 | 023 | −95 | 013 | −60 | 003 | −25 | 053 |
| 11 | 154 | 46 | 144 | 81 | 134 | −94 | 124 | −59 | 114 | −24 | 104 |
| 12 | 205 | 47 | 255 | 82 | 245 | −93 | 235 | −58 | 225 | −23 | 215 |
| 13 | 316 | 48 | 306 | 83 | 356 | −92 | 346 | −57 | 336 | −22 | 326 |
| 14 | 420 | 49 | 410 | 84 | 400 | −91 | 450 | −56 | 440 | −21 | 430 |
| 15 | 031 | 50 | 021 | 85 | 011 | −90 | 001 | −55 | 051 | −20 | 041 |
| 16 | 142 | 51 | 132 | 86 | 122 | −89 | 112 | −54 | 102 | −19 | 152 |
| 17 | 253 | 52 | 243 | 87 | 233 | −88 | 223 | −53 | 213 | −18 | 203 |
| 18 | 304 | 53 | 354 | 88 | 344 | −87 | 334 | −52 | 324 | −17 | 314 |
| 19 | 415 | 54 | 405 | 89 | 455 | −86 | 445 | −51 | 435 | −16 | 425 |
| 20 | 026 | 55 | 016 | 90 | 006 | −85 | 056 | −50 | 046 | −15 | 036 |
| 21 | 130 | 56 | 120 | 91 | 110 | −84 | 100 | −49 | 150 | −14 | 140 |
| 22 | 241 | 57 | 231 | 92 | 221 | −83 | 211 | −48 | 201 | −13 | 251 |
| 23 | 352 | 58 | 342 | 93 | 332 | −82 | 322 | −47 | 312 | −12 | 302 |
| 24 | 403 | 59 | 453 | 94 | 443 | −81 | 433 | −46 | 423 | −11 | 413 |
| 25 | 014 | 60 | 004 | 95 | 054 | −80 | 044 | −45 | 034 | −10 | 024 |
| 26 | 125 | 61 | 115 | 96 | 105 | −79 | 155 | −44 | 145 | −9 | 135 |
| 27 | 236 | 62 | 226 | 97 | 216 | −78 | 206 | −43 | 256 | −8 | 246 |
| 28 | 340 | 63 | 330 | 98 | 320 | −77 | 310 | −42 | 300 | −7 | 350 |
| 29 | 451 | 64 | 441 | 99 | 431 | −76 | 421 | −41 | 411 | −6 | 401 |
| 30 | 002 | 65 | 052 | 100 | 042 | −75 | 032 | −40 | 022 | −5 | 012 |
| 31 | 113 | 66 | 103 | 101 | 153 | −74 | 143 | −39 | 133 | −4 | 123 |
| 32 | 224 | 67 | 214 | 102 | 204 | −73 | 254 | −38 | 244 | −3 | 234 |
| 33 | 335 | 68 | 325 | 103 | 315 | −72 | 305 | −37 | 355 | −2 | 345 |
| 34 | 446 | 69 | 436 | 104 | 426 | −71 | 416 | −36 | 406 | −1 | 456 |

The residue number code, moduli 5, 6 and 7, is capable of uniquely defining 210 different numerical values before the residue coded numbers repeat. The foregoing table lists the positive numbers 0 through 104 opposite the corresponding residue coded numbers. The residue coded numbers corresponding to decimal numbers 105 through 209 are assigned negative decimal values —105 through —1, in that order. The complementing scheme is one wherein the sum of a positive number and its equal negative number is 000. For example, +52 corresponds with residue coded number 243, and —52 corresponds with residue coded number 324. The sum of 2 and 3 to base 5 is 0, the sum of 4 and 2 to base 6 is 0 and the sum of 3 and 4 to base 7 is 0.

The specific three digit residue coded number system illustrated in Table I may be generalized by calling the decimal equivalent number N, the three digits of the equivalent residue number $R_a$, $R_b$ and $R_c$, and the respective bases or moduli $M_a$, $M_b$ and $M_c$. The number of different quantities N is equal to the product of the moduli $M_a$, $M_b$ and $M_c$. In the example of Table I, the product of 5, 6 and 7 is 210, which may be designated $\overline{M}$. The complement system is one wherein positive residue coded numbers correspond with positive decimal numbers N in the range of 0 through $$\frac{\overline{M}}{2}-1$$

(0 through 104), and wherein negative residue coded numbers correspond with positive decimal numbers in the range $\overline{M}/2$ through $\overline{M}-1$ (105 through 209).

It will observed from examining the residue coded numbers in Table I that there is no apparent way to determine whether a residue coded number standing alone represents a positive or a negative decimal quantity. Of course, a table look-up code converter system could be constructed to indicate the sign of all the residue coded numbers, but this would be unduly complex and expensive. The sign determination apparatus according to the present invention will be explained, by way of example, as apparatus which can receive any one of the 210 different residue coded numbers in Table I, and provide an output signal indicative of the algebraic sign of the number.

It will be observed that all of the numbers in Table I are divided into 30 groups, and that in each group the values of the residue digit to modulo 7 include numbers 0 through 6. All residue number systems can be similarly arranged in groups determined by the digits corresponding to one of the odd moduli. In the present example, the odd modulo 7 is employed to determine the groups; however, the odd modulo 5 could alternatively be used. The manner in which the grouping of the residue coded numbers is utilized for sign determination according to the present invention will be now briefly described.

Assume it is desired to determine the algebraic sign of the residue coded number 134 (corresponding with the decimal number +81). The method followed is to reduce the residue coded number 134 to the number at the lower extreme end of the group in which it falls, the number being residue coded number 250 (corresponding with decimal number +77). The residue coded number 134 is reduced to the residue coded number 250 by subtracting 4 from each of the digits of the residue coded number 134, keeping in mind that the differences must be expressed in the respective moduli 5, 6 and 7. It is not necessary to actually subtract 4 (modulo 7) from itself because the difference is obviously zero. The 4 is subtracted from residue digit 3 (modulo 6) and the difference expressed to the base 6 is 5. The 4 subtracted from the residue digit 1 (modulo 5) gives a difference expressed to the base 5 of 2. By this subtraction procedure, the translated residue coded number 250 is derived from the original residue coded number 134. The translated residue coded number is one of 30 residue coded numbers at the lower end of respective ones of the 30 groups of numbers in Table I. The following Table II shows the 30 possible translated numbers corresponding to the 30 groups of numbers:

*Table II*

| Positive numbers | | | | | | Negative numbers | | | | | |
|---|---|---|---|---|---|---|---|---|---|---|---|
| N | 567 | N | 567 | N | 567 | N | 567 | N | 567 | N | 567 |
| 0 | 000 | 35 | 050 | 70 | 040 | −105 | 030 | −70 | 020 | −35 | 010 |
| 7 | 210 | 42 | 200 | 77 | 250 | −98 | 240 | −63 | 230 | −28 | 220 |
| 14 | 420 | 49 | 410 | 84 | 400 | −91 | 450 | −56 | 440 | −21 | 430 |
| 21 | 130 | 56 | 120 | 91 | 110 | −84 | 100 | −49 | 150 | −14 | 140 |
| 28 | 340 | 63 | 330 | 98 | 320 | −77 | 310 | −42 | 300 | −7 | 350 |

All of the residue numbers in the foregoing Table II are alike in having a 0 for the third digit (modulo 7). The first two digits, modulo 5 and modulo 6, are unique for the 30 different numbers. A simple two-dimensional translator or matrix code converter is employed to determine the sign of the number. In the present example, the digits 25 of the residue coded number 250 are applied to the input of a translator which provides a signal output indicating that the original number 134 is a positive quantity.

The foregoing sign determination procedure is based on translating a given number to a lower number within the same group. The same final result can be achieved by translating the given number to the highest number in the group by adding 6 minus 4=2 to each of the residue coded digits 134. In the present example, this would involve translating the residue coded number 134 (+81) to the residue coded number 356 (+83), and then applying the digits 35 to a translator which gives an output indicative of the sign of the original number 134. The previously described method of reducing the given number by subtraction is presently preferred because it requires somewhat less hardware in its implementation.

The operation of the apparatus illustrated in FIGURES 2, 3 and 4 in performing the operation of algebraic sign determination will now be described. It is assumed that the residue coded number $R_a$, $R_b$ and $R_c$ of which the sign is to be determined is present on the similarly labeled lines of the main bus 10 in binary coded form. The operation starts with the opening of gates 14, 15 and 41 by the application of gating pulses $G_a$, $G_b$ and $G_h$ to the respective gates. This directs the first residue digit $R_a$ to the $X_1$ register 17 and the $X_1$ binary-to-residue encoder 26; directs the binary coded residue number $R_b$ to the $Y_1$ register 18 and the $Y_1$ binary-to-residue encoder 27; and directs the binary coded residue digit $R_c$ to the $X_2$ register 20 and the $X_2$ binary-to-residue encoder 23, and also directs the digit $R_c$ to the $Y_2$ register 21 and the $Y_2$ binary-to-residue encoder 24. The encoders 23, 24, 26 and 27 translate the binary coded residue number digits to simple residue number digits as represented by the energization of one output conductor from each of the encoders. The operation of the encoders are as have been described in connection with a description of FIGURE 3 of the drawings.

Following the example of determining the sign of a residue number $R_a$, $R_b$, $R_c$ equals to 134 (equivalent to +81), the first digit $R_a$ equal to 1 appears in binary coded form as 001, and is translated by encoder 26 (FIGURE 2) to an energization of the one conductor designated 1 of the lines 66 connected to the $M_a$ translator and decoder 29. Similarly, the binary coded residue number digit $R_b$ equal to 3 which is represented in binary form by the digit 011 is encoded by the encoder 27 to provide energization of the one conductor labeled 3 of the lines 67 connected to the $M_b$ arithmetic translator, decoder and sign translator 30'. At the same time the binary coded residue number digit $R_c$ equal to 4 is translated by both of the encoders 23 and 24 to the energization of the one wire labeled 4 of the leads 65 applied to the $M_a$ unit 29 and also the one of the conductors labeled 4 of the leads 59 applied to the $M_b$ unit 30'.

The $M_a$ translator and decoder 29 performs the operation of subtraction in subtracting the residue coded number digit $R_c$, (4), from the residue cooled digit $R_a$, (1), and provides an output to modulo 5 on output conductors 32 in the binary code, the output number being binary 2 or 010. Simultaneously, the $M_b$ unit 30' performs subtraction in subtracting the residue coded number $R_c$, (4), from the residue coded digit $R_b$, (3). The difference, when evaluated to the base 6, is equal to 5, which is represented on the output leads 33 as 101 in binary form. The subtraction process, and the residue number to binary number decoding operation, occur simultaneously in the $M_a$ unit 29 and the $M_b$ unit 30'. The decoded result, in binary number form, appears directly on the respective output conductors 32 and 33. Subtraction and residue-to-binary decoding is achieved by a construction shown in detail in FIGURE 4 of the drawings and designated translator and decoder 70. The operation of the translator and decoder 70 can be understood from a study of FIGURE 4 of the drawings; the operation will not be described in greater detail here because the unit 70 is a known arrangement.

As thus far described, the apparatus of FIGURE 2 has operated to the point where the $X_3$ register 35 contains the difference $R_a - R_c$, which in the present example is 2 in binary form, and the $Y_3$ register 36 contains the difference $R_b - R_c$, which in the present example is 5 in binary form. The subtraction of the value of $R_c$ from itself to yield 0 is unnecessary and is not actually performed in the apparatus. The digits in the $X_3$ register 35 and the $Y_3$ register 36 correspond to the first two digits (25) of one (250) of the 30 residue numbers listed in Table II.

The next step in the sign determination process is to open the gates 38 and 39 by the application of gating pulses $G_j$ and $G_k$ to the respective gates. This permits the two binary coded residue digits ($R_a - R_c = 2$ and $R_b - R_c = 5$) in the registers to be directed to the $R_a$ conductors and the $R_b$ conductors, respectively, of the main bus 10. Thereafter, or simultaneously therewith, the gates 42 and 15 are opened by the application thereto of gating pulses $G_i$, $G_b$, respectively. When gate 42 is open, the binary coded residue digit 2 is applied to the $Y_2$ register 21, to the $Y_2$ encoder 24 where it is translated to an energization of the number 2 output conductor of lines 59, and is applied to one input of the $M_b$ translator, decoder and sign translator unit 30'. The other difference, binary coded residue digit 5, is directed through gate 15 to the $Y_1$ register 18, to $Y_1$ encoder 27 where it is translated to an energization of the number 5 output conductor of the output leads 67 and is applied to the other input of the $M_b$ unit 30'.

It will be observed in FIGURE 4 of the drawings that the conductors of the input lines 59 and 67 to the $M_b$ unit 30' extend through the arithmetic translator and decoder 70 to the sign translator 71. Therefore, the arithmetic unit 70 performs a subtraction function on the two input numbers even though no subtraction function is desired. This does not have any undesired effect because the arithmetic output gate 39 is not opened at this time to release the result of the subtraction process. However, the operation of the sign translator 71, which occurs simultaneously, provides a desired output which is applied over output winding 85 and through the gate 50 which receives a gating signal $G_s$, to the sign output terminal 51. Of course, if desired, the sign translator unit 71 may be constructed to be completely separated from the translator and decoder 70, in which case the sign translator is provided with its own inputs to which the two difference signals are applied through appropriate gates.

The sign translator 71 is a magnetic core matrix code converter having magnetic cores positioned at certain of the crossovers of the two sets of coordinate input conductors 59 and 67, and having a sense output winding 85 which provides an output, or no output depending on the values of the two two-digit residue coded numbers applied to the input of the translator. In constructing a sign translator unit 71, the locations of magnetic cores 83 may be determined by writing a truth table following the information in the previously given Table II. For example, the polarity truth table for the residue number system moduli 5, 6, 7, derived from Table II is as follows:

*Table III*

| | | Digit Modulo 6 | | | | | |
|---|---|---|---|---|---|---|---|
| | | 0 | 1 | 2 | 3 | 4 | 5 |
| Digit Modulo 5 | 0 | + | − | − | − | + | + |
| | 1 | − | + | + | + | − | − |
| | 2 | + | + | − | − | − | + |
| | 3 | − | − | + | + | + | − |
| | 4 | + | + | + | − | − | − |

In the specific example of the modulo 5 digit 2 and the modulo 6 digit 5, the above truth table indicates the sign of the original number to be positive. In the sign translator 71 of FIGURE 4, the magnetic cores 83 are positioned at crossovers corresponding with plus signs in truth Table III. Thus, an input on the 2 conductor of lines 59 and an input on the 5 conductor of lines 67 causes a switching of the core 83', which is sensed by the conductor 85 to provide an output on the sign output lead 51 indicating that the original residue coded number 134 is a positive number (equal to +81).

The sign output signal on lead 51 which indicates whether the original number is positive or negative is utilized in any desired manner in the computer. The sign output may be used to determine a sign bit which is associated with the original residue coded number in the computer memory.

The sign determination arrangement which has been described is one in which the given residue coded number is translated to another residue coded number having digits corresponding to all but one of the odd moduli at extreme values, and then the digits corresponding to the one remaining odd modulo and the even modulo are converted to a signal indicative of the sign of the original given number. Alternatively, the same final result can be accomplished by translating the given residue coded number to another residue coded number having digits corresponding to all odd moduli at extreme values, and then converting the one digit corresponding to the even modulo to a signal indicative of the sign of the original given number. This alternative arrangement is basically the same as the one previously described, and it is not preferred because it involves the additional time required for performing an additional subtraction.

While the invention has been described as applied to a residue coded number system including three digits corresponding to three moduli, the invention is also applicable to residue number systems employing more than three digits. In this case, a table of the numbers may be written and divided into groups each containing all of the possible digits of one odd moduli. A given residue coded number, of which the sign is to be determined, is translated by subtraction or addition to a number at one extreme end of the group in which it falls. A second table of such extreme numbers may be written and these numbers are divided into sub-groups each of which contains all the possible digits of another one of the odd moduli. Then the previously translated number is further translated to an extreme end of the sub-group in which it falls. This procedure is continued for all but one of the odd moduli. Then the digit corresponding to the one remaining odd moduli and the even moduli are applied to a sign translator (like sign translator 71 in FIGURE 4) to produce an output signal indicative of the sign of the original given number.

It is thus apparent that according to this invention there is provided a simple, inexpensive and reliable means for determining the algebraic sign of any given number in a residue coded complemented number system.

What is claimed is:

1. In apparatus including multiconductor busses $R_a$, $R_b$ and $R_c$ for corresponding binary coded digits of residue coded digits of residue coded numbers derived from the least positive residues of corresponding decimal numbers with respect to a plurality of bases or moduli $M_a$, $M_b$ and $M_c$, means for determining the sign of any particular residue coded number $R_a'$ $R_b'$ $R_c'$, comprising in combination, $M_a$ and $M_b$ arithmetic translators and decoders each having inputs for a minuend digit and a subtrahend digit and having an output for a binary coded difference digit, at least three encoders each having an input for a binary coded residue number digit and having an output consisting of a plurality of individual digit-indicating conductors, means including said encoders for coupling a binary coded digit $R_c'$ from said $R_c$ bus to subtrahend inputs of both of said arithmetic translators and decoders, means including said encoders for coupling a binary coded digit $R_a'$ from said $R_a$ bus to the minuend input of the $M_a$ arithmetic translator and decoder, and for coupling a binary coded digit $R_b'$ from said $R_b$ bus to the minuend input of the $M_b$ arithmetic translator and decoder, a sign translator matrix having two inputs for two respective digits and having an output, and means including said encoders for coupling the outputs of said two arithmetic translators and decoders to the two inputs of said sign translator matrix.

2. In apparatus including multiconductor busses $R_a$, $R_b$ and $R_c$ for corresponding binary coded digits of residue coded numbers derived from the least positive residues of corresponding decimal numbers with respect to a plurality of bases or moduli $M_a$, $M_b$ and $M_c$ which are prime to each other and where one of the moduli is even, where the quantity of available different numbers is equal to $\overline{M}$ which is the product of the bases or moduli $M_a$, $M_b$ and $M_c$, and where positive residue coded numbers correspond with positive decimal numbers in the range of 0 through $$\frac{\overline{M}}{2}-1$$

and where negative residue coded numbers correspond with positive decimal numbers in the range of $\overline{M}/2$ through $\overline{M}-1$, said residue coded numbers being characterized in that the numbers consist of groups of positive numbers and groups of negative numbers, means for determining the sign of any particular residue coded number $R_a'$ $R_b'$ $R_c'$, comprising in combination, $M_a$ and $M_b$ arithmetic translators and decoders each having inputs for a minuend digit and a subtrahend digit and having an output for a binary coded difference digit, at least three encoders each having an input for a binary coded residue number digit and having an output consisting of a plurality of individual digit-indicating conductors, means including said encoders for coupling a binary coded digit $R_c'$ from said $R_c$ bus to subtrahend inputs of both of said arithmetic translators and decoders, means including said encoders for coupling a binary coded digit $R_a'$ from said $R_a$ bus to the minuend input of the $M_a$ arithmetic translator and decoder, and for coupling a binary coded digit $R_b'$ from said $R_b$ bus to the minuend input of the $M_b$ arithmetic translator and decoder, whereby said two arithmetic translators and decoders provide respective output binary coded difference digits $R_a''$ and $R_b''$, a sign translator matrix having two inputs for two respective digits and having an output, and means including said encoders for coupling the outputs of said two arithmetic translators and decoders to the two inputs of said sign translator matrix, whereby the output of said sign translator matrix indicates the algebraic sign of the residue coded number having digits $R_a'$, $R_b'$ and $R_c'$.

References Cited by the Examiner

UNITED STATES PATENTS

| | | | |
|---|---|---|---|
| 2,898,040 | 8/59 | Steele | 235—175 |
| 2,910,235 | 10/59 | Southard | 235—153 |
| 2,969,535 | 1/61 | Foulkes | 235—154 |
| 3,105,231 | 9/63 | Gordon et al. | 235—154 |

OTHER REFERENCES

IBM Reference Manual 7070 Data Processing System, International Business Machines Corp., White Plains, New York, revised (August 1960).

MALCOLM A. MORRISON, *Primary Examiner.*

WALTER W. BURNS, Jr., *Examiner.*